US009550455B2

United States Patent
Foley et al.

(10) Patent No.: US 9,550,455 B2
(45) Date of Patent: Jan. 24, 2017

(54) MULTI-FOCUS OPTICAL SYSTEM

(71) Applicant: Gentex Corporation, Zeeland, MI (US)

(72) Inventors: Andrew M. Foley, West Olive, MI (US); Robert E. Roush, Jr., Holland, MI (US); Henry A. Luten, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 620 days.

(21) Appl. No.: 13/869,277

(22) Filed: Apr. 24, 2013

(65) Prior Publication Data
US 2013/0286188 A1    Oct. 31, 2013

Related U.S. Application Data

(60) Provisional application No. 61/638,013, filed on Apr. 25, 2012.

(51) Int. Cl.
*H04N 5/253* (2006.01)
*B60Q 11/00* (2006.01)
*H04N 5/232* (2006.01)

(52) U.S. Cl.
CPC ........... *B60Q 11/00* (2013.01); *H04N 5/23212* (2013.01)

(58) Field of Classification Search
CPC .. H04N 7/185; H04N 5/23212; G05D 1/0038; B60Q 11/00
USPC .......................................... 348/114, 118, 272
See application file for complete search history.

(56) References Cited

U.S. PATENT DOCUMENTS

| | | |
|---|---|---|
| 5,148,209 A | 9/1992 | Subbarao |
| 5,193,124 A | 3/1993 | Subbarao |
| 6,362,773 B1 | 3/2002 | Pochmuller |
| 7,151,996 B2 | 12/2006 | Stein |
| 7,243,945 B2 | 7/2007 | Breed et al. |
| 7,440,634 B2 | 10/2008 | Ben-Ezra et al. |
| 7,620,202 B2 | 11/2009 | Fujimura et al. |
| 7,684,590 B2 | 3/2010 | Kampchen et al. |
| 7,723,662 B2 | 5/2010 | Levoy et al. |

(Continued)

OTHER PUBLICATIONS

Andras Bodis-Szomoru, Tamas Daboczi, Zoltan Fazekas, A Far-Range Off-line Camera Calibration Method for Stereo Lane Detection Systems, Instrumentation and Measurement Technology Conference—IMTC 2007, Warsaw, Poland, May 1-3, 2007, 6 pages.

*Primary Examiner* — Michael Lee
(74) *Attorney, Agent, or Firm* — Price Heneveld LLP; Bradley D. Johnson

(57) ABSTRACT

An imager system configured for a vehicle control system is provided that includes at least one imager configured to capture a multi-focus image having depth data, the imager comprising an image sensor comprising an array of pixels, and an optics assembly in optical communication with the image sensor, the optics assembly configured to capture light rays, wherein the optics assembly comprising a main lens assembly configured to substantially focus a scene on to a plane, a micro lens assembly in optical communication between the main lens and the image sensor to substantially focus on to same the plane as the main lens assembly extending out to infinity, and a controller in communication with the imager, wherein the controller is configured to output a signal for controlling a function of the vehicle, the signal based upon the depth data determined from the multi-focus image.

56 Claims, 11 Drawing Sheets

(56) References Cited

U.S. PATENT DOCUMENTS

| | | | |
|---|---|---|---|
| 7,792,423 | B2 | 9/2010 | Raskar et al. |
| 7,936,392 | B2 | 5/2011 | Ng et al. |
| 7,962,033 | B2 | 6/2011 | Georgiev et al. |
| 7,965,936 | B2 | 6/2011 | Raskar et al. |
| 8,160,439 | B2 | 4/2012 | Georgiev et al. |
| 8,248,515 | B2 | 8/2012 | Ng et al. |
| 8,289,440 | B2 | 10/2012 | Knight et al. |
| 2007/0154068 | A1 | 7/2007 | Stein et al. |
| 2008/0266655 | A1* | 10/2008 | Levoy et al. ............ 359/368 |
| 2008/0297374 | A1* | 12/2008 | Usami ..................... 340/935 |
| 2010/0277935 | A1 | 11/2010 | Endo et al. |
| 2011/0149125 | A1* | 6/2011 | Morimoto ........... H04N 5/225 348/272 |
| 2011/0234841 | A1 | 9/2011 | Akeley et al. |
| 2012/0050562 | A1 | 3/2012 | Perwass et al. |
| 2014/0320656 | A1* | 10/2014 | Foley ..................... 348/148 |

\* cited by examiner

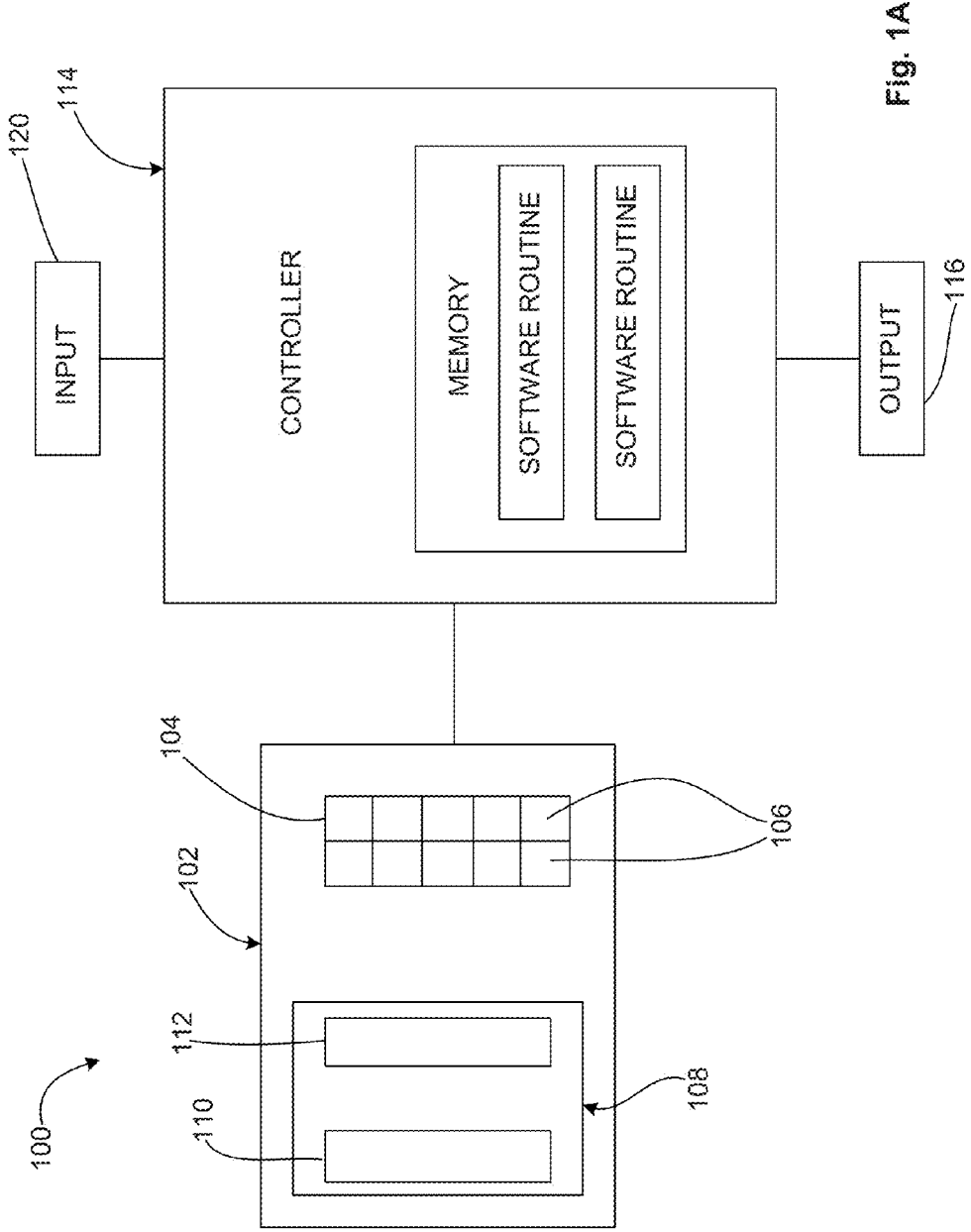

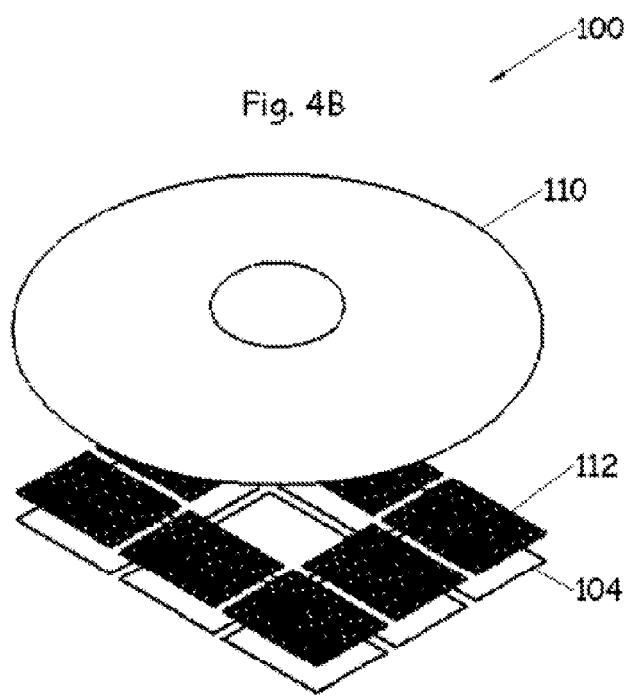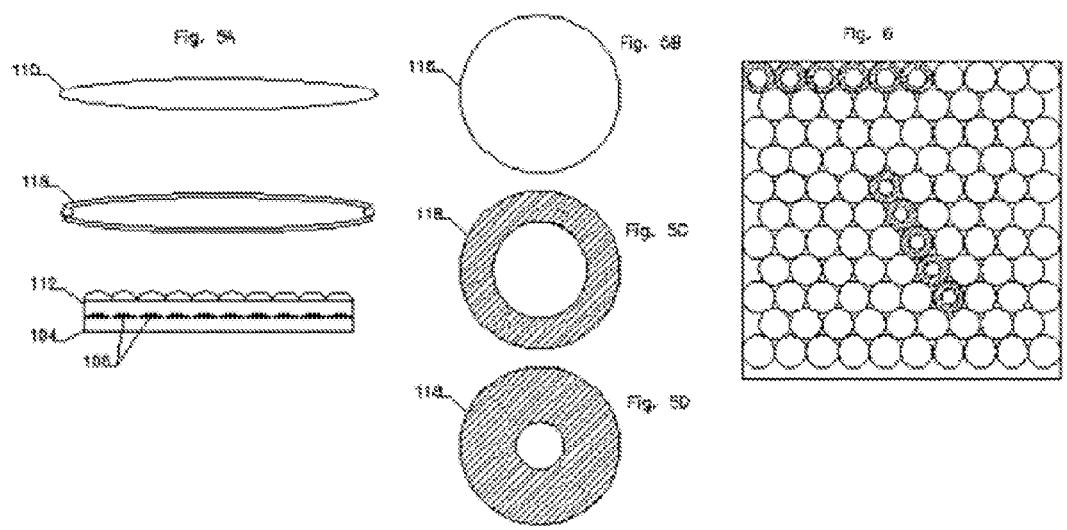

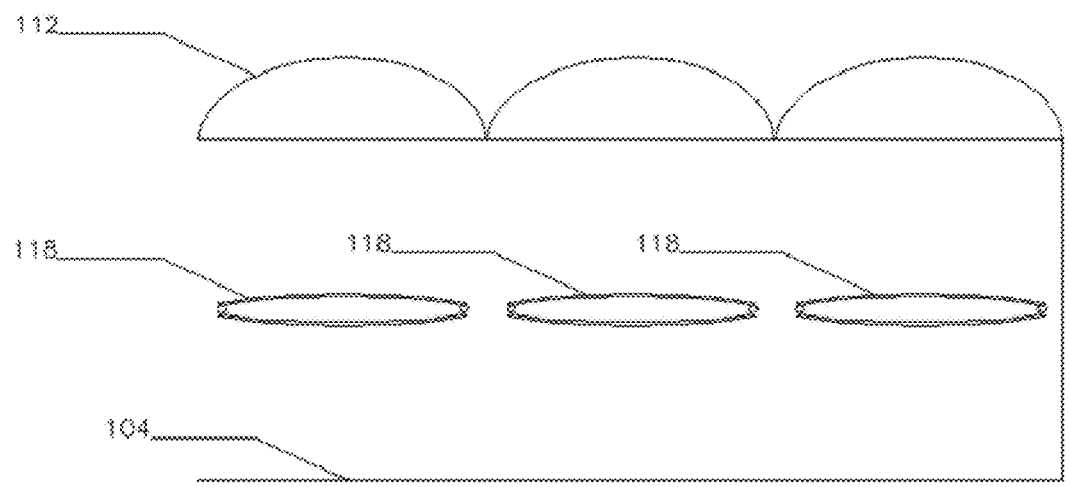
Fig. 7
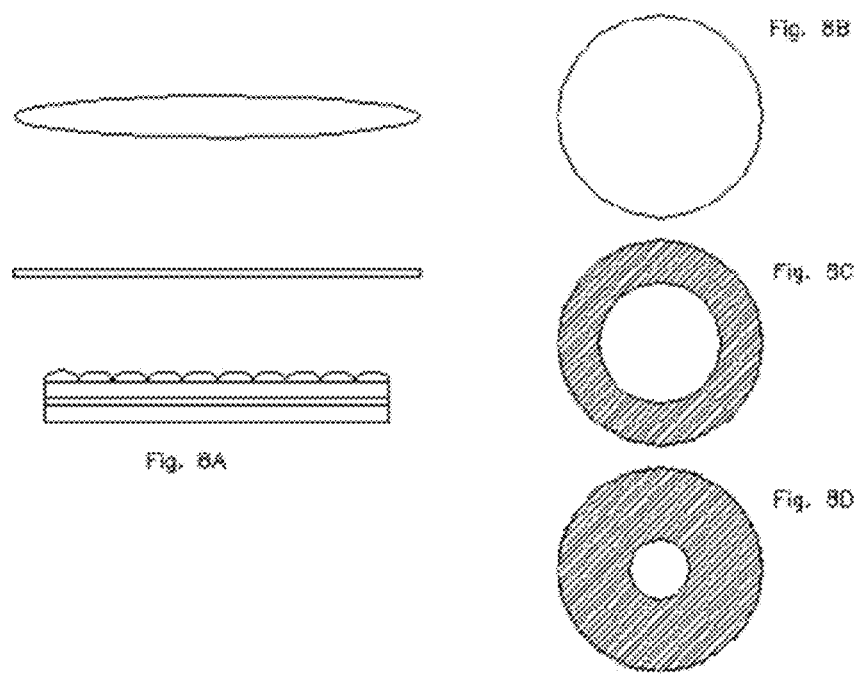
Fig. 8A
Fig. 8B
Fig. 8C
Fig. 8D

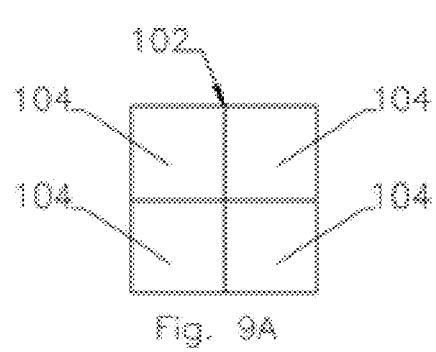 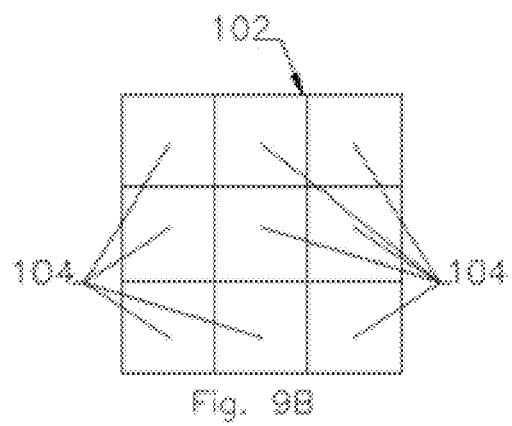
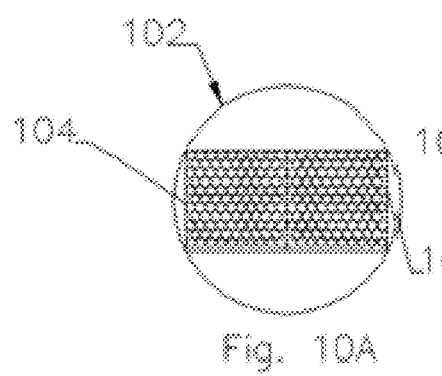 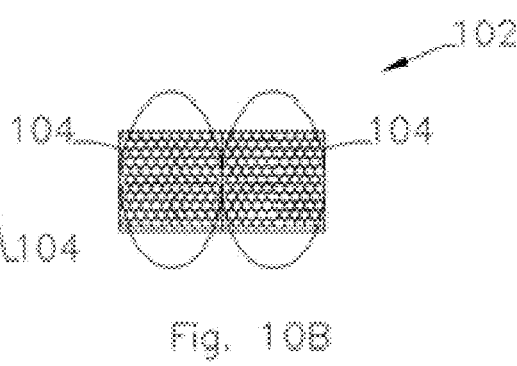
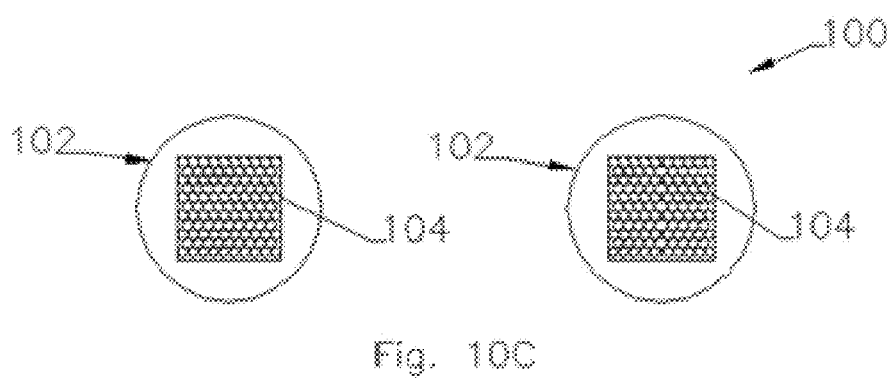

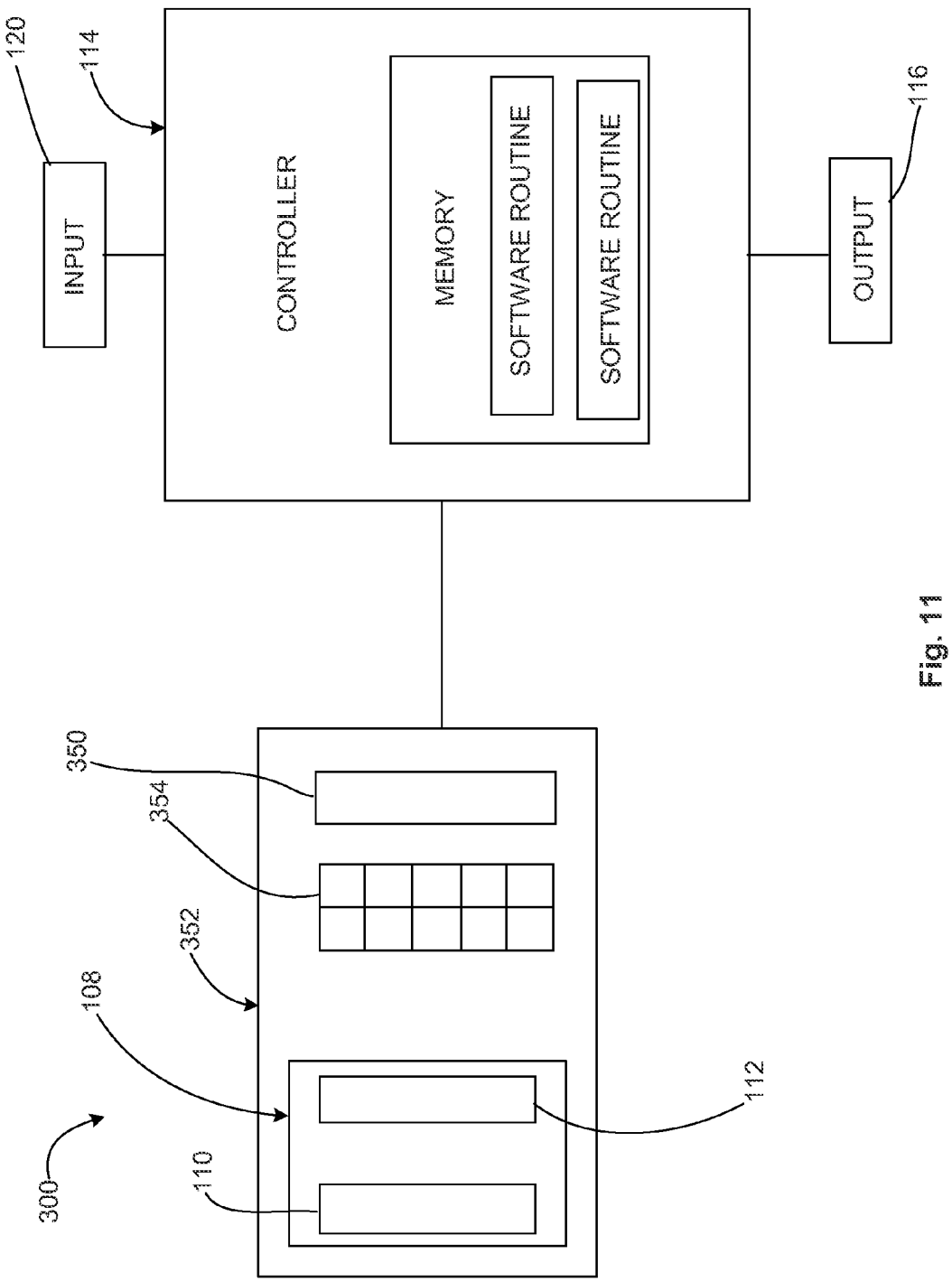

MULTI-FOCUS OPTICAL SYSTEM

CROSS-REFERENCE TO RELATED APPLICATION

This application claims the benefit of and priority to U.S. Provisional Patent Application No. 61/638,013, filed on Apr. 25, 2012, entitled "MULTI-FOCUS CAMERA AND PLENOPTIC LENSING SYSTEMS," the entire disclosure of which is hereby incorporated herein by reference.

FIELD OF THE INVENTION

The present invention generally relates to a multi-focus optical system, and more particularly, a multi-focus optical system including an imager or a display with multi-focus optics.

BACKGROUND OF THE INVENTION

Generally, vehicles can have imager systems for controlling vehicle functions based upon the captured images.

SUMMARY OF THE INVENTION

According to one aspect of the present invention, an imager system configured for a vehicle control system, the imager system comprises at least one imager configured to capture a multi-focus image having depth data, the imager comprising an image sensor comprising an array of pixels, and an optics assembly in optical communication with the image sensor, the optics assembly configured to capture light rays, wherein the optics assembly comprising a main lens assembly configured to substantially focus a scene on to a plane, a micro lens assembly in optical communication between the main lens and the image sensor to substantially focus on to same the plane as the main lens assembly extending out to infinity, and a controller in communication with the imager, wherein the controller is configured to output a signal for controlling a function of the vehicle, the signal based upon the depth data determined from the multi-focus image.

According to another aspect of the present invention, a display system configured for an occupant display system, the display system comprising at least one display assembly configured to display a multi-focus image having depth data, the display assembly comprising a display comprising an array of pixels, and an optics assembly in optical communication with the display, the optics assembly configured to display light rays, wherein the optics assembly comprising a main lens assembly configured to substantially project a scene on to at least one planes extending out to infinity, a micro lens assembly in optical communication between the main lens and the display to substantially project on to the at least one plane and extending out to infinity, and a controller in communication with the display assembly, wherein the controller is configured to receive an input from an imager and output a signal for displaying an image on the display assembly, the image having depth data.

These and other features, advantages, and objects of the present invention will be further understood and appreciated by those skilled in the art by reference to the following specification, claims, and appended drawings.

BRIEF DESCRIPTION OF THE DRAWINGS

The present invention will become more fully understood from the detailed description and the accompanying drawings, wherein:

FIG. 1A is a block diagram of an imager system, in accordance with one embodiment of the present invention;

FIG. 4B is a schematic diagram of an imager system, in accordance with one embodiment of the present invention;

FIG. 5A is a schematic diagram of an imager system, in accordance with one embodiment of the present invention;

FIG. 5B is a schematic diagram of an electro-optic aperture in an approximately fully open state, in accordance with one embodiment of the present invention;

FIG. 5C is a schematic diagram of an electro-optic aperture in an at least partially closed state, in accordance with one embodiment of the present invention;

FIG. 5D is a schematic diagram of an electro-optic aperture in an at least partially closed state, in accordance with one embodiment of the present invention;

FIG. 6 is a schematic diagram of a plurality of electro-optic apertures, in accordance with one embodiment of the present invention;

FIG. 7 is a schematic diagram of an imager system, wherein at least a portion of the micro lenses has a corresponding electro-optic aperture, in accordance with one embodiment of the present invention FIG. 8A is a schematic diagram of an imager system, in accordance with one embodiment of the present invention;

FIG. 8B is a schematic diagram of an electro-optic aperture in an approximately fully open state, in accordance with one embodiment of the present invention;

FIG. 8C is a schematic diagram of an electro-optic aperture in an at least partially closed state, in accordance with one embodiment of the present invention;

FIG. 8D is a schematic diagram of an electro-optic aperture in an at least partially closed state, in accordance with one embodiment of the present invention;

FIG. 9A is a schematic diagram of an imager having a plurality of imager sensors, in accordance with one embodiment of the present invention;

FIG. 9B is a schematic diagram of an imager having a plurality of image sensors, in accordance with one embodiment of the present invention;

FIG. 10A is a schematic diagram of an imager system having a plurality of imagers, in accordance with one embodiment of the present invention;

FIG. 10B is a schematic diagram of an imager system having a plurality of imagers, in accordance with one embodiment of the present invention;

FIG. 10C is a schematic diagram of an imager system having a plurality of imagers, in accordance with one embodiment of the present invention;

FIG. 11 is a block diagram of a display system, in accordance with one embodiment of the present invention;

DETAILED DESCRIPTION

Figure 1B:
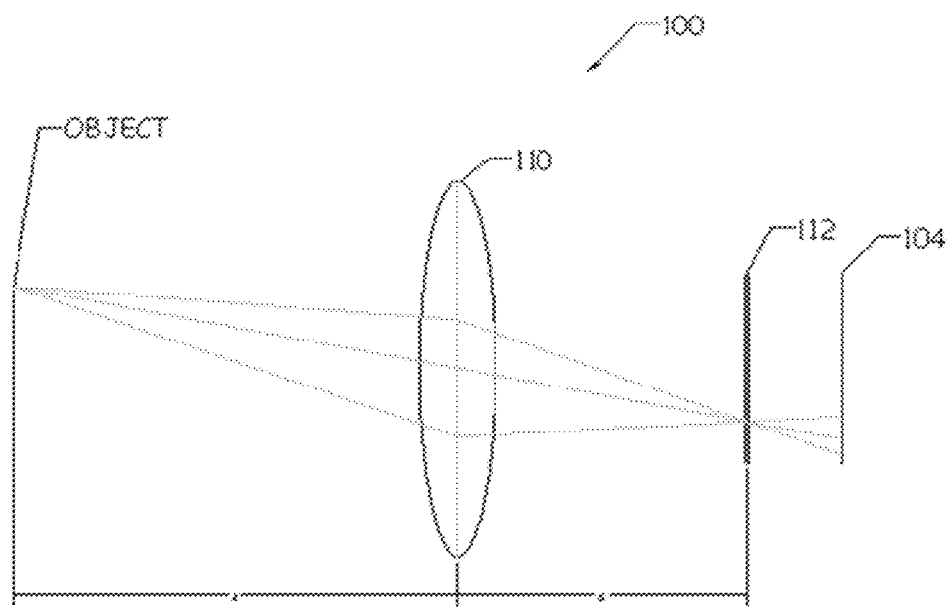
FIG. 1B is a schematic diagram of an imager system, in accordance with one embodiment of the present invention.

The present illustrated embodiments reside primarily in combinations of method steps and apparatus components related to a multi-focus optical system. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 1C:
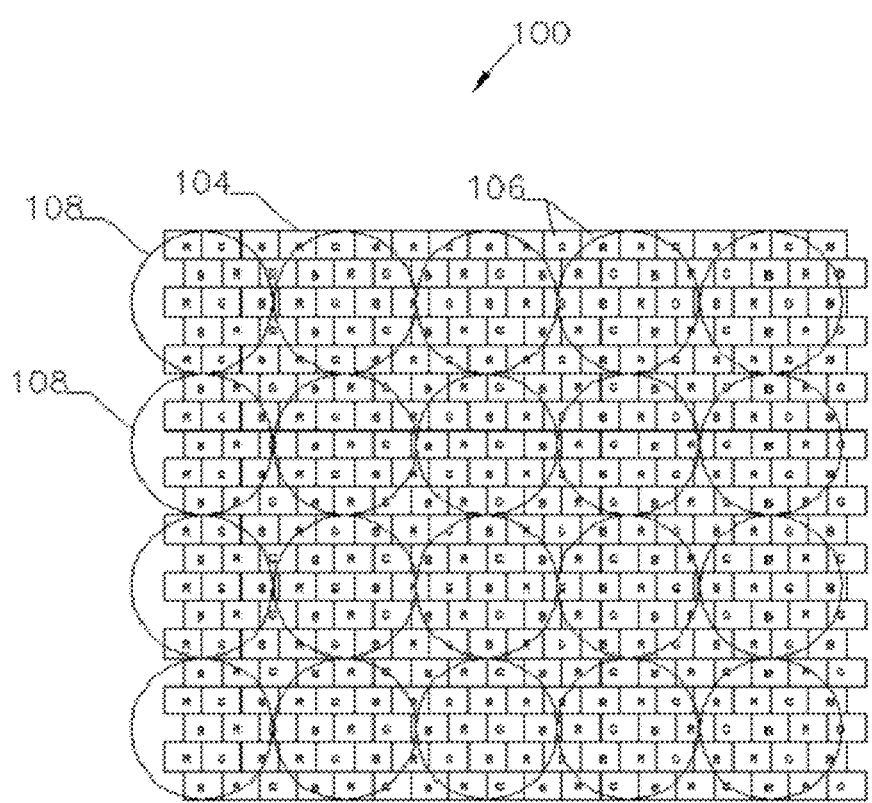
FIG. 1C is a schematic diagram of an imager system, in accordance with one embodiment of the present invention.

In reference to FIGS. 1A-1C, an imager system is generally shown at reference identifier 100. Typically, the imager system 100 can be configured to be used in a vehicle control system. The imager system can include at least one imager generally indicated at reference identifier 102, which can be configured to capture a multi-focus image having depth data, wherein the imager 102 includes an image sensor 104 having an array of pixels 106, and an optics assembly generally indicated at reference identifier 108, which is in optical communication with the image sensor 104. The optics assembly 108 can be configured to capture light rays, and include a main lens assembly 110 and a micro lens assembly 112. The main lens assembly 110 can be configured to substantially focus a scene on to a plane. The micro lens assembly 112 can be in optical communication between the imager sensor 104 and the main lens assembly 110 and configured to substantially focus on to the same plane as the main lens assembly 110 extending out to infinity. The imager system 100 can further include a controller generally indicated at reference identifier 114, which is in communication with the imager 102. The controller 114 can be configured to output signal 116 for controlling a function of the vehicle, and the signal 116 is based upon the depth data determined from the multi-focus image, as described in greater detail herein.

Figure 2:
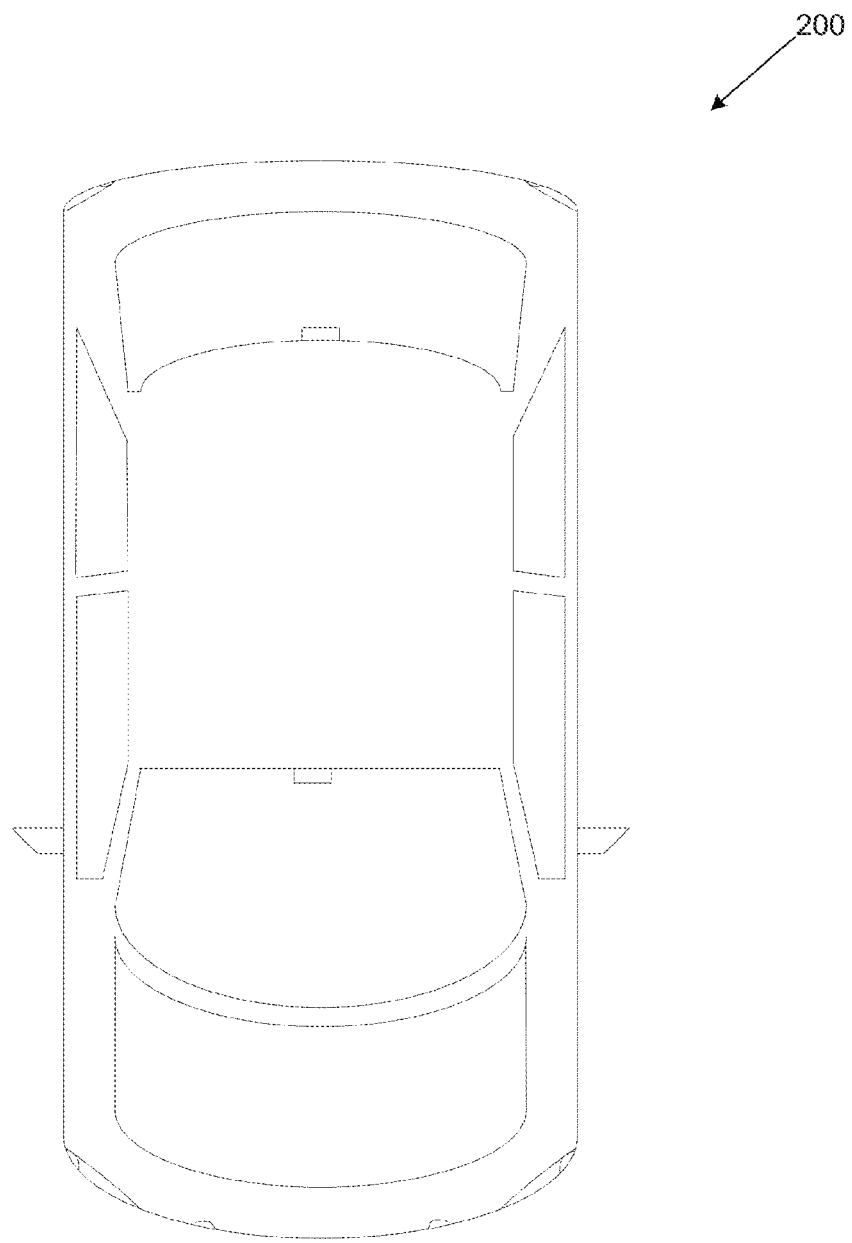
FIG. 2 is an environmental view of an imager system or display system, in accordance with embodiments of the present invention.
Figures 3A, 3B, 3C, 3D:
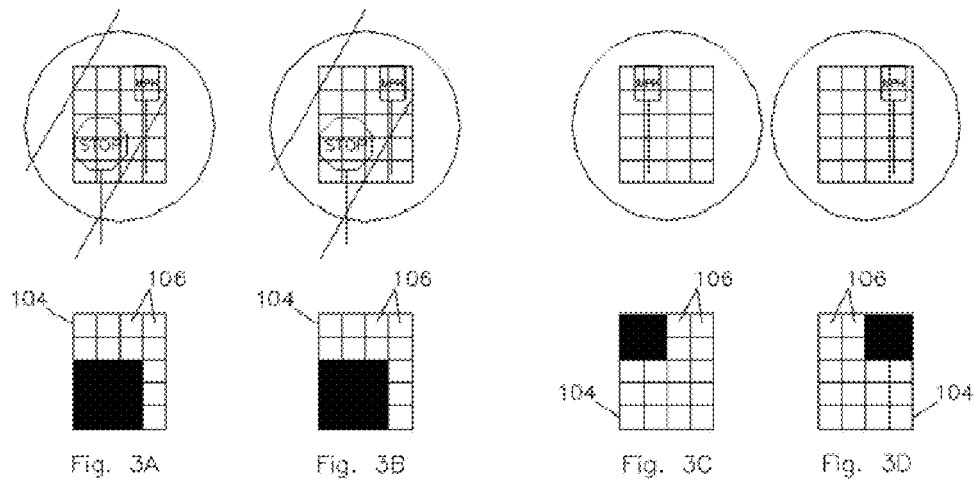
FIGS. 3A-D are schematic diagrams of a scene being imaged by an imager, in accordance with embodiments of the present invention.

By way of explanation and not limitation, in regards to FIGS. 1A-2, the imager system 100 can be used in a vehicle 200, such that the imager system 100 is configured to capture a multi-focus image having depth data, wherein the depth data can be used to control one or more vehicle functions. Thus, the imager system 100 can be mounted anywhere on the vehicle 200, such as, but not limited to, viewing a scene approximately forward of the vehicle 200, viewing a scene approximately rearward of the vehicle 200, viewing a scene approximately side-wards of the vehicle 200, a scene exterior to the vehicle 200, a scene interior of the vehicle 200, the like, or a combination thereof, so that depth data of objects in the imaged scene can be obtained independent of a second imager. Examples of vehicle control systems are, but not limited to, a headlamp control system, a forward collision warning system, a lane keeping assist system, an object detection system, a pedestrian detection system, a traffic sign recognition system, a display system, an occupant detection system, an intruder detection system, the like, or a combination thereof.

According to one embodiment, the main lens assembly 110 and the micro lens assembly 112 can have a hexagonal layout (FIG. 1C), which can enhance spatial frequency of lenses. Thus, the hexagonal layout can be used with lower resolution imagers and/or enhance color data that is obtained as compared to a standard Bayer pattern. Additionally or alternatively, the main lens assembly 110 and micro lens assembly 112 can have a circular layout, a rectangular layout, an elliptical layout, an octagonal layout, other suitable geometric shape layout, or a combination thereof.

With respect to FIGS. 1 and 3A-3D, the imager system 100 can be configured so a predetermined number of pixels correspond to a minimum size of an object to be detected, according to one embodiment. For example, an object that is imaged on at least four pixels can be further evaluated through one or more image processing techniques. The predetermined number of pixels can be related to the resolution of the imager 102. Additionally or alternatively, the micro lens assembly 112 can be configured so areas of the image sensor 104 have a different pixel pitch and/or different resolution. Such an embodiment can be utilized in a vehicle control system that detects objects.

Figure 4A:
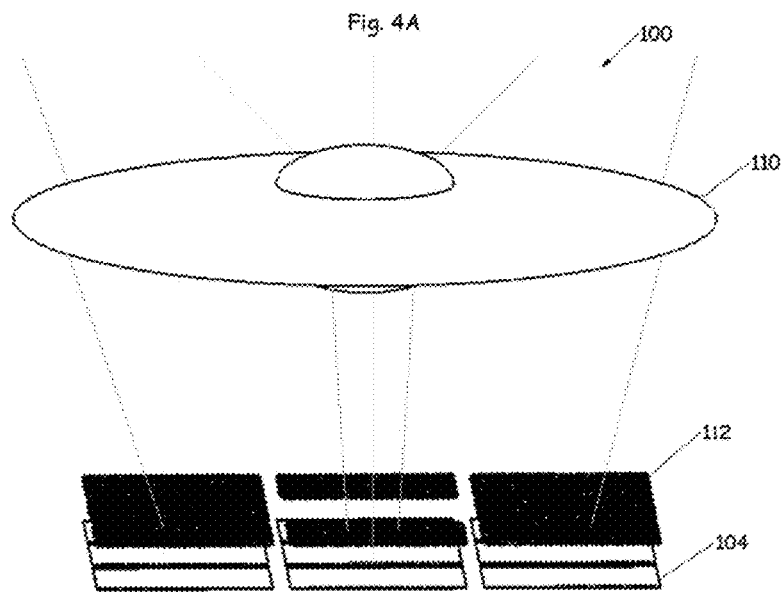
FIG. 4A is a schematic diagram of an imager system, in accordance with one embodiment of the present invention.
Figure 12B:
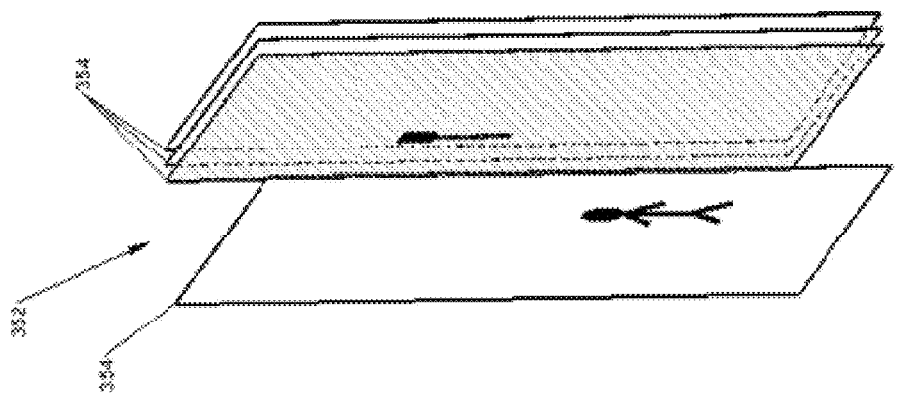
FIG. 12B is a schematic diagram of a display system, in accordance with one embodiment of the present invention.
Figure 12A:
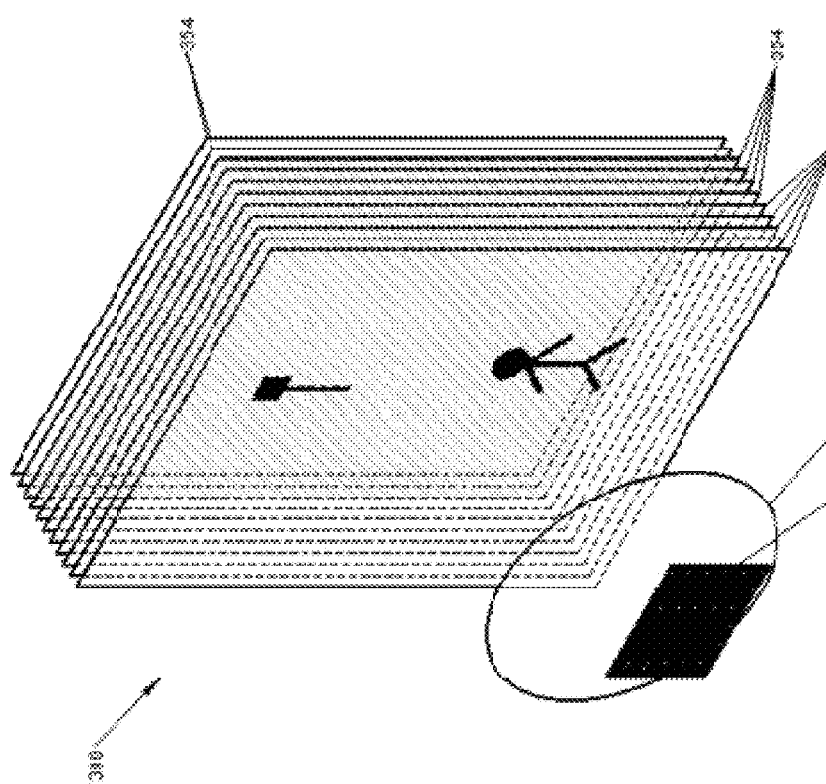
FIG. 12A is a schematic diagram of a display system, in accordance with one embodiment of the present invention.
Figure 13A:
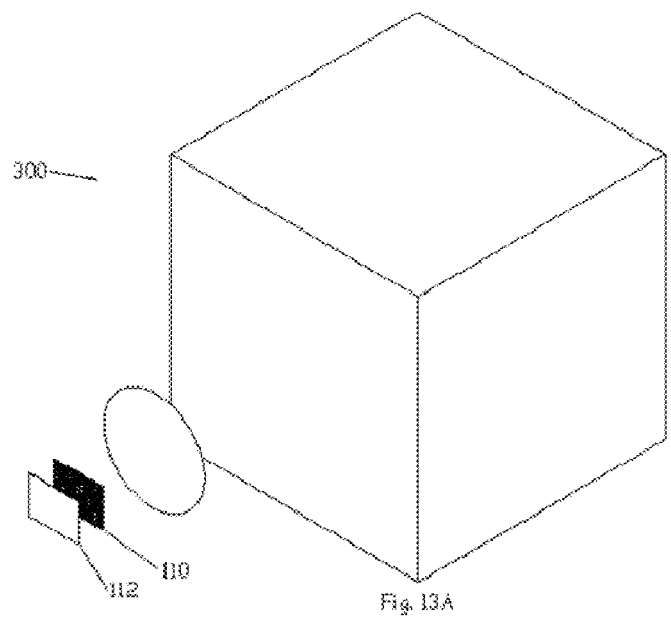
FIG. 13A is a schematic diagram of a display system, in accordance with one embodiment of the present invention.
Figure 13B:
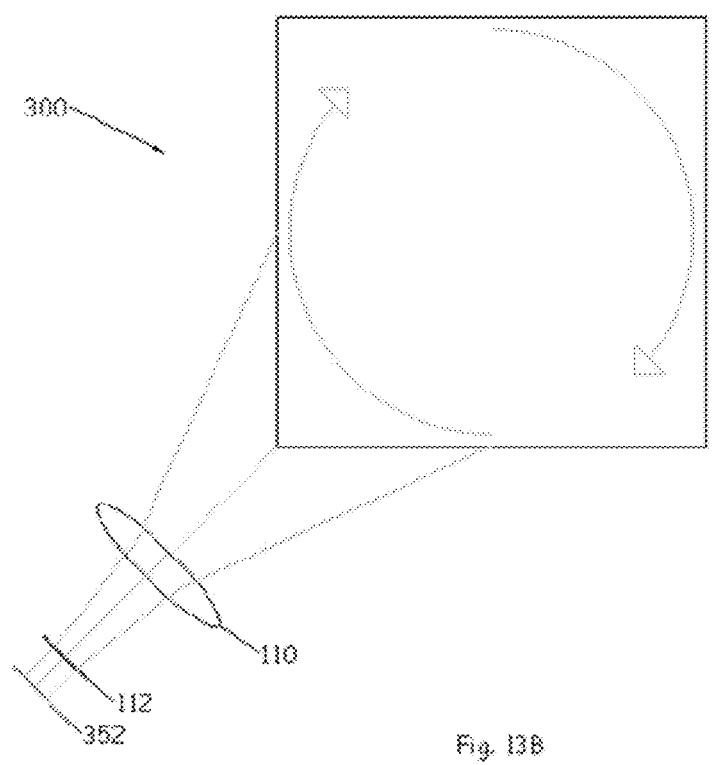
FIG. 13B is a schematic diagram of a display system, in accordance with one embodiment of the present invention.

In regards to an embodiment illustrated in FIGS. 4A and 4B, the image 102 can be configured so that a portion of the pixels 106 correspond to only the main lens assembly 110 and another portion of the pixels 106 correspond to the micro lens assembly 112. In such an embodiment, the imager system 100 can be configured to output an image as if the micro lens assembly 112 was not used, while also including the depth data that is captured based upon the pixels receiving light that propagated through the micro lens assembly 112. Additionally or alternatively, the main lens assembly 110 can have a different focal length in a center portion than other portions.

With respect to FIGS. 5A-8D, the optical assembly 108 can include an electro-optic aperture assembly 118. It should be appreciated by those skilled in the art that the electro-optic aperture assembly 118 can be a separate component or integrated with the main lens assembly 110 or micro lens assembly 112. The electro-optic aperture assembly 118 can be configured to form circular, elliptical, or other suitable shaped apertures. The electro-optic aperture assembly 118 can be configured to shape the aperture with respect to the micro lenses of the micro lens assembly 112. For purposes of explanation and not limitation, the electro-optic aperture assembly 118 can change shapes in one micro lens increments (FIG. 7). The electro-optic aperture assembly 118 can be, but is not limited to, electrochromic (FIGS. 5A-5D), liquid crystal (FIGS. 8A-8D), or the like. It should be appreciated by those skilled in the art that various states illustrated in FIGS. 5B-5D and FIGS. 8B-8D are applicable for both an embodiment wherein a electro-optic aperture assembly 118 corresponds to the main lens assembly 110 and an embodiment wherein a plurality of electro-optic aperture assemblies 118 correspond to the main lens assembly 110 and/or the micro lens assembly 112.

As to FIGS. 9A and 9B, the imager system 100 can include a plurality of image sensors 104 as one imager 102 or separate imagers 102, according to one embodiment. At least one of the plurality of image sensors 104 can be a different resolution than others of the plurality of image sensors 104. In either embodiment, where the plurality of image sensors 104 are the same or different resolutions, at least a portion of the plurality of image sensors 104 can be combined to form (or be processed) as a single image. In such an embodiment, affects of bad pixels is reduced, the image is more scalable, and/or high speed extraction, parallel processing with image pyramiding is enhanced.

According to one embodiment, with respect to FIGS. 10A-10C, the imager system 100 can include a plurality of imagers 102 can be used in the vehicle 200 as a stereo system. A stereo system can enhance effectiveness, and the imager system 100 can have redundancy with respect to depth data, as the depth data can be obtained from a single imager 102 or a plurality of imagers 102. The plurality of imagers 102 can be in optical communication with main lens assembly 110, the plurality of imagers 102 can be in optical communication with separate main lens assemblies 110, or a combination thereof. Additionally or alternatively, at least a portion of the plurality of imagers 102 can have different color filters (e.g., red filter, blue filter, green filter, etc.), wherein the optics assembly 108 can be configured for a respective color.

Examples of an imager are disclosed in U.S. Pat. No. 8,289,430, entitled "HIGH DYNAMIC RANGE IMAGING DEVICE," U.S. Pat. No. 8,305,471, entitled "HIGH DYNAMIC RANGE IMAGING DEVICE," U.S. Pat. No. 8,378,284, entitled "IMAGING DEVICE," U.S. Pat. No. 8,144,223, entitled "IMAGING DEVICE," U.S. Patent Application Pub. No. 2009/0256938, entitled "IMAGING DEVICE," and U.S. Patent Application Pub. No. 2009/0190015, entitled "IMAGING DEVICE," all of which are hereby incorporated herein by reference in their entirety.

With respect to FIGS. 11-13B, a display system is generally shown at reference identifier 300. The display system 300 can be configured for use in the vehicle 200 in addition or alternatively to the imager system 100. Typically, the display system 300 includes similar optics as the imager system 100; however, the display system 300 includes a light engine assembly 350 instead of an image sensor as in the imager system 100.

The display system 300 can include at least one display assembly generally indicated at reference identifier 352 that can be configured to display a multi-focus image having depth data. The display assembly 352 can include a display 354 and the optics assembly 110. The display 354 can include an array of pixels 356. The optics assembly 110 can be in optical communication with the display 354, and configured to capture light rays. The optics assembly 108 can include the main lens assembly 110 configured to substantially focus a scene on to a plane, and the micro lens assembly 112 in optical communication between the main lens assembly 110 and the display 354 to substantially focus on to the same place as the main lens assembly 110 extending out to infinity. The display system 300 can also include a controller 356 in communication with the display assembly 352, wherein the controller is configured to receive an input from an imager and output a signal for displaying an image on the display assembly 352, the displayed image having depth data, as described in greater detail herein.

According to one embodiment, the display system 300 can be a three-dimensional (3D) display system. In such an embodiment, the display system 300 can be in communication with the imager system 100, and the micro lens assembly 112 of the imager system 100 can correspond to the micro lens assembly 112 of the display system 300. Additionally or alternatively, the display system 300 can be configured to project the image onto a rotating object that can be approximately synchronized with the light engine 350 (or projector), project the image onto a plurality of panes of liquid crystal (e.g., 3D liquid crystal) configured to block the image at certain depths, or the like, so as to provide a real three dimensional scene.

The display system 300 can be used in a vehicle 200, such as, but not limited to, replacing one or more of rearview mirrors. For example, the image can be projected onto a mirror to increase distance of an observer to an object, and can be used to obtain long distance focus back to the observer. Additionally or alternatively, the image can be slightly out of focus if in near view so the eyes of a viewer will focus on the far field. Thus, the display system 300 would appear focused at infinity so that a viewer's eyes don't need to be refocused to process a two-dimensional image.

Figure 14A:
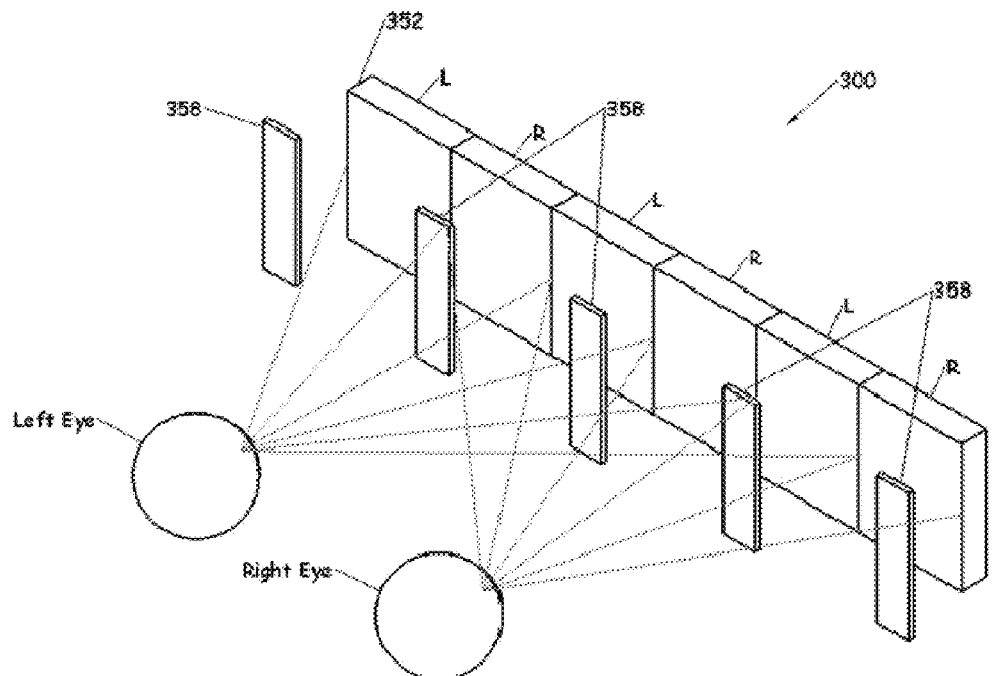
FIG. 14A is a schematic diagram of a display system, in accordance with one embodiment of the present invention.
Figure 14B:
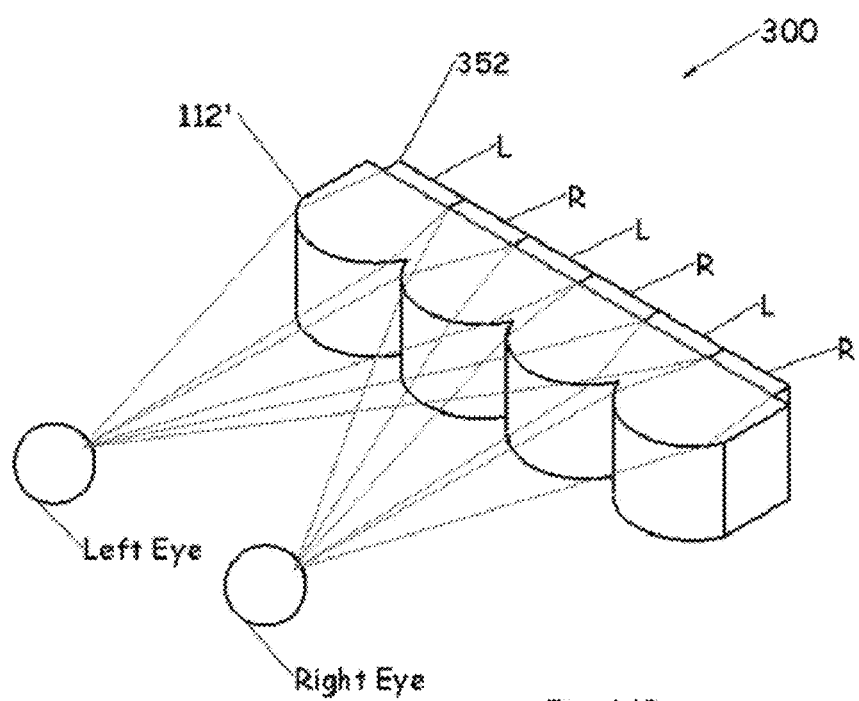
FIG. 14B is a schematic diagram of a display system, in accordance with one embodiment of the present invention.

According to one embodiment, as exemplary illustrated in FIGS. 14A and 14B, the display system 300 can be configured as a glassless 3D display. An embodiment, as illustrated in FIG. 14A, can be a parallax glassless 3D display, and an embodiment, as illustrated in FIG. 14B, can be a lenticular glassless 3D display. In such an embodiment, the display system 300 can be configured to operate based upon a viewer's characteristics. Thus, a camera monitoring the viewer can be used, so that a controller can be configured to control the image displayed on the display 354 based upon the position, height, size, etc. of the viewer. This can result in a different displayed image for each eye of the viewer and providing the appearance of depth. As exemplary illustrated in FIG. 14A, the display system 300 can include at least one parallax barrier 358. For example, in an embodiment with at least one parallax barrier 358, each row of pixels can display a different image, and the parallax barrier 358 can be configured to move to alter which image is viewed by the viewer. A parallax assembly can be configured to adjust dynamically, based upon data stored in memory, the like, or a combination thereof. Also, as exemplary illustrated in FIG. 14B, the display system 300 can include the micro lens assembly, such as a lenticular lens array 112'. For example, in an embodiment with at least one lenticular lens array 112', each row of pixels can display a different image, and the lenticular lens array 112' can be configured to move to alter which image is viewed by the viewer. A lenticular lens array 112' can be configured to adjust dynamically. The dynamic adjust can be based upon, but is not limited to, data stored in memory.

In any of the embodiments described herein, the systems 100, 300 can be configured to reduce power consumption. By way of explanation and not limitation, the systems 100, 300 can include a field programmable gate array (FPGA), a digital signal processor (DSP), parallel RISC/CISC architectures, the like, or a combination thereof Additionally or alternatively, the systems 100, 300 can be configured to communicate (e.g., output 116 and/or input 120) with a vehicle bus (e.g., CAN, LIN, GMLAN, etc.).

The output 116 can be a control signal that is received by another vehicle component, such that the other vehicle component is controlled based upon the control signal. According to an alternate embodiment, the output 116 can be a signal that is received by another vehicle component wherein the vehicle component is controlled based upon the received output 116 (e.g., data, recommendation, etc.).

With respect to FIGS. 1A and 11A, the controller can include or be in communication with a memory device 122 configured to store one or more executable software routines 124. Thus, the controller 114 can be configured to execute the one or more executable software routines to process an image and/or display an image, as described herein.

It will be appreciated that embodiments of the invention described herein may be comprised of one or more conventional processors and unique stored program instructions that control one or more processors to implement, in conjunction with certain non-processor circuits, some, most, or all of the functions of a multi-focus optical system, as described herein. The non-processor circuits may include, but are not limited to signal drivers, clock circuits, power source circuits, and/or user input devices. As such, these functions may be interpreted as steps of a method used in using or constructing a classification system. Alternatively, some or all functions could be implemented by a state machine that has no stored program instructions, or in one or more application specific integrated circuits (ASICs), in which each function or some combinations of certain functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

For purposes of the present disclosure, and as will be explained in greater detail herein below, the electrochromic medium preferably comprises at least one solvent, at least one anodic material, and at least one cathodic material.

Typically, both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference.

Examples of electro-optic materials are disclosed in U.S. Pat. No. 8,228,590, entitled "ELECTRO-OPTIC SYSTEM CONFIGURED TO REDUCE A PERCEIVED COLOR CHANGE," and U.S. patent application Ser. No. 13/865,592 (unofficial) filed on Apr. 18, 2013, entitled "ELECTRO-OPTIC SYSTEM CONFIGURED TO REDUCE A PERCEIVED COLOR CHANGE," all of which are hereby incorporated herein by reference in their entirety.

Other examples of an electrochromic medium can be chosen from one of the following categories:

(I) Single-layer, single-phase—The electrochromic medium may comprise a single-layer of material which may include small non-homogenous regions, and include solution-phase devices where a material may be contained in solution in an ionically conducting electrolyte which remains in solution in the electrolyte when electrochemically oxidized or reduced. Solution-phase electroactive materials may be contained in the continuous solution-phase of a gel medium in accordance with the teachings of U.S. Pat. No. 5,928,572 entitled "Electrochromic Layer And Devices Comprising Same," and International Patent Application Serial No. PCT/US98/05570 entitled "Electrochromic Polymeric Solid Films, Manufacturing Electrochromic Devices Using Such Solid Films, And Processes For Making Such Solid Films And Devices," both of which are hereby incorporated herein by reference in their entirety.

More than one anodic and cathodic material can be combined to give a pre-selected color as described in U.S. Pat. No. 5,998,617 entitled "Electrochromic Compounds," U.S. Pat. No. 6,020,987 entitled "Electrochromic Medium Capable Of Producing A Pre-selected Color," U.S. Pat. No. 6,037,471 entitled "Electrochromic Compounds," and U.S. Pat. No. 6,141,137 entitled "Electrochromic Media For Producing A Pre-selected Color," all of which are hereby incorporated herein by reference in their entirety including all references incorporated and/or cited therein.

The anodic and cathodic materials may also be combined or linked by a bridging unit as described in U.S. Pat. No. 6,241,916 entitled "Electrochromic System" and/or U.S. Patent Publication No. 2002/0015214 A1 entitled "Electrochromic Device," which are hereby incorporated herein by reference in their entirety including all references incorporated and/or cited therein. The electrochromic materials may also include near-infrared (NIR) absorbing compounds as described in U.S. Pat. No. 6,193,912 entitled "Near Infrared-Absorbing Electrochromic Compounds And Devices Comprising Same," which is hereby incorporated herein by reference in its entirety including all references incorporated and/or cited therein.

It is also possible to link anodic materials or cathodic materials by similar methods. The concepts described in these patents can further be combined to yield a variety of electroactive materials that are linked or coupled, including linking of a redox buffer, such as linking of a color-stabilizing moiety, to an anodic and/or cathodic material.

The anodic and cathodic electrochromic materials can also include coupled materials as described in U.S. Pat. No. 6,249,369 entitled "Coupled Electrochromic Compounds With Photostable Dication Oxidation States," which is hereby incorporated herein by reference in its entirety including all references incorporated and/or cited therein.

The concentration of the electrochromic materials can be selected as taught in U.S. Pat. No. 6,137,620 entitled "Electrochromic Media With Concentration Enhanced Stability, Process For The Preparation Thereof and Use In Electrochromic Devices," which is hereby incorporated herein by reference in its entirety including all references incorporated and/or cited therein.

Additionally, a single-layer, single-phase medium may include a medium where the anodic and cathodic materials are incorporated into a polymer matrix as is described in International Patent Application Serial No. PCT/EP98/03862 entitled "Electrochromic Polymer System," and International Patent Application Serial No. PCT/US98/05570 entitled "Electrochromic Polymeric Solid Films, Manufacturing Electrochromic Devices Using Such Solid Films, And Processes For Making Such Solid Films And Devices," which is hereby incorporated herein by reference in its entirety including all references incorparated and/or cited therein.

(II) Multi-layer—The electrochromic medium may also be prepared in layers and include a material attached directly to an electrically conducting electrode or confined in close proximity thereto which remains attached or confined when electrochemically oxidized or reduced.

(III) Multi-phase—The electrochromic medium may further be prepared using multiple phases where one or more materials in the medium undergoes a change in phase during the operation of the device, for example a material contained in solution in the ionically conducting electrolyte forms a layer on the electrically conducting electrode when electrochemically oxidized or reduced.

According to one embodiment, an imager system configured for a vehicle control system, the imager system comprising at least one imager configured to capture a multi-focus image having depth data, the imager comprising an image sensor comprising an array of pixels and an optics assembly in optical communication with the image sensor, the optics assembly configured to capture light rays, wherein the optics assembly comprising a main lens assembly configured to substantially focus a scene on to a plane a micro lens assembly in optical communication between the main lens and the image sensor to substantially focus on to same the plane as the main lens assembly extending out to infinity, and a controller in communication with the imager, wherein the controller is configured to output a signal for controlling a function of the vehicle, the signal based upon the depth data determined from the multi-focus image.

The imager system as described herein, wherein the function of the vehicle that is controlled based upon the signal is at least one of headlamp control, forward collision warning, lane keeping assist, object detection, pedestrian detection, traffic sign recognition, displaying an image, occupant detection, and intruder detection.

The imager system as described herein, wherein the function of the vehicle that is controlled based upon the signal is object detection for collision avoidance, and an imaged object is ignored if the imaged object is imaged by less than about four pixels of the array of pixels.

The imager system as described herein, wherein a diameter of a first micro lens at an outer portion of the micro lens assembly are different than a diameter of a second micro lens at an inner portion of the micro lens assembly.

The imager system as described herein, wherein the micro lens diameters are one of circular, rectangular, hexagonal, or octagonal.

The imager system as described herein, wherein a profile of a first micro lens at an outer portion of the micro lens assembly are different than a profile of a second micro lens at an inner portion of the micro lens assembly.

The imager system as described herein, wherein the micro lens profiles are one of circular, rectangular, hexagonal, or octagonal.

The imager system as described herein, wherein the main lens assembly comprises an inner portion and an outer portion, and the inner portion has a different focal length than the outer portion.

The imager system as described herein further comprising an electro-optic lens assembly in optical communication with the main lens assembly, wherein the electro-optic lens assembly is configured to alter transmittance states to define an aperture with respect to the main lens assembly, the micro lens assembly, and the imager.

The imager system as described herein, wherein the electro-optic lens assembly is one of an electrochromic aperture assembly and a liquid crystal aperture assembly.

The imager system as described herein further comprising an electro-optic lens assembly in optical communication with the micro lens assembly, wherein the electro-optic lens assembly is configured to alter transmittance states to define an aperture with respect to the micro lens assembly and the imager.

The imager system as described herein, wherein the electro-optic lens assembly is one of an electrochromic aperture assembly and a liquid crystal aperture assembly.

The imager system as described herein, wherein the at least one imager comprises a plurality of imagers in optical communication with the main lens assembly.

The imager system as described herein, wherein micro lenses of the micro lens assembly is configured to enhance effectiveness of imaging on the pixel array.

The imager system as described herein, wherein the micro lenses of the micro lens assembly are substantially hexagonally shaped.

The imager system as described herein, wherein pixels of the array of pixels are configured to enhance effectiveness of imaging of the micro lens assembly.

The imager system as described herein, wherein the main lens assembly and the micro lens assembly have at least one different diameter, profile, and focal length.

The imager system as described herein, wherein the controller comprises at least one of a field programmable gate array (FPGA), digital signal processor (DSP), and a parallel RISC/CISC.

The imager system as described herein, wherein the main lens assembly and the micro lens assembly are configured to enhance spatial recognition in one of a vertical axis and horizontal axis.

The imager system as described herein, wherein the main lens assembly and the micro lens assembly are elliptical.

The imager system as described herein, wherein the at least one imager comprises at least two of a first imager comprising a main lens assembly and a micro lens assembly configured for imaging a near-field scene, a second imager comprising a main lens assembly and a micro lens assembly configured for imaging a mid-field scene, and a third imager comprising a main lens assembly and a micro lens assembly configured for imaging a far-field scene.

A display system configured for an occupant display system, the display system comprising at least one display assembly configured to display a multi-focus image having depth data, the display assembly comprising a display comprising an array of pixels, and an optics assembly in optical communication with the display, the optics assembly configured to display light rays, wherein the optics assembly comprising a main lens assembly configured to substantially project a scene on to at least one planes extending out to infinity, a micro lens assembly in optical communication between the main lens and the display to substantially project on to the at least one planes and extending out to infinity, and a controller in communication with the display assembly, wherein the controller is configured to receive an input from an imager and output a signal for displaying an image on the display assembly, the image having depth data.

The display system as described herein, wherein a diameter of a first micro lens at an outer portion of the micro lens assembly are different than a diameter of a second micro lens at an inner portion of the micro lens assembly.

The display system as described herein, wherein the micro lens diameters are one of circular, rectangular, hexagonal, or octagonal.

The display system as described herein, wherein a profile of a first micro lens at an outer portion of the micro lens assembly are different than a profile of a second micro lens at an inner portion of the micro lens assembly.

The display system as described herein, wherein the micro lens profiles are one of circular, rectangular, hexagonal, or octagonal.

The display system as described herein, wherein the main lens assembly comprises an inner portion and an outer portion, and the inner portion has a different focal length than the outer portion.

The display system as described herein, wherein micro lenses of the micro lens assembly are substantially hexagonally shaped.

The display system as described herein, wherein pixels of the array of pixels are substantially hexagonally shaped.

The display system as described herein, wherein the controller comprises at least one of a field programmable gate array (FPGA), digital signal processor (DSP), and a parallel RISC/CISC.

The display system as described herein, wherein the main lens assembly and the micro lens assembly are elliptical.

The display system as described herein configured as a glasses-free 3-dimensional display.

The display system as described herein, wherein micro lenses of the micro lens assembly are aligned with pixels of the display assembly.

It should be appreciated by those skilled in the art that the image system 100 and display system 300 may have advantages not explicitly described herein. It should further be appreciated by those skilled in the art that the components of the image system 100 and display system 300 may be combined in ways not explicitly stated herein.

Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. An imager system configured for a vehicle control system, said imager system comprising:
    at least one imager configured to capture a multi-focus image having depth data, said imager comprising:
        an image sensor comprising an array of pixels; and
        an optics assembly in optical communication with said image sensor, said optics assembly configured to capture light rays and comprising:
            a main lens assembly configured to substantially focus a scene on to a plane;
            a micro lens assembly in optical communication between said main lens and said image sensor to substantially focus on to same said plane as said main lens assembly extending out to infinity, wherein a diameter of a first micro lens at an outer portion of said micro lens assembly is different than a diameter of a second micro lens at an inner portion of said micro lens assembly; and
    a controller in communication with said imager, wherein said controller is configured to output a signal for controlling a function of the vehicle, said signal based upon said depth data determined from said multi-focus image.

2. The imager system of claim 1, wherein said function of the vehicle that is controlled based upon said signal is at least one of headlamp control, forward collision warning, lane keeping assist, object detection, pedestrian detection, traffic sign recognition, displaying an image, occupant detection, and intruder detection.

3. The imager system of claim 1, wherein said function of the vehicle that is controlled based upon said signal is object detection for collision avoidance, and an imaged object is ignored if said imaged object is imaged by less than about four pixels of said array of pixels.

4. The imager system of claim 1, wherein said micro lens diameters are one of circular, rectangular, hexagonal, and octagonal.

5. The imager system of claim 1, wherein said at least one imager comprises a plurality of imagers in optical communication with said main lens assembly.

6. The imager system of claim 1, wherein micro lenses of said micro lens assembly are configured to enhance effectiveness of imaging on said pixel array.

7. The imager system of claim 6, wherein said micro lenses of said micro lens assembly are substantially hexagonally shaped.

8. The imager system of claim 1, wherein said controller comprises at least one of a field programmable gate array (FPGA), a digital signal processor (DSP), and a parallel RISC/CISC.

9. The imager system of claim 1, wherein said main lens assembly and said micro lens assembly are configured to enhance spatial recognition in one of a vertical axis and horizontal axis.

10. The imager system of claim 9, wherein said main lens assembly and said micro lens assembly are elliptical.

11. The imager system of claim 1, wherein said at least one imager comprises at least two of a first imager comprising a main lens assembly and a micro lens assembly configured for imaging a near-field scene, a second imager comprising a main lens assembly and a micro lens assembly configured for imaging a mid-field scene, and a third imager comprising a main lens assembly and a micro lens assembly configured for imaging a far-field scene.

12. An imager system configured for a vehicle control system, said imager system comprising:
    at least one imager configured to capture a multi-focus image having depth data, said imager comprising:
        an image sensor comprising an array of pixels; and
        an optics assembly in optical communication with said image sensor, said optics assembly configured to capture light rays, wherein said optics assembly comprising:
            a main lens assembly configured to substantially focus a scene on to a plane;
            a micro lens assembly in optical communication between said main lens and said image sensor to substantially focus on to same said plane as said main lens assembly extending out to infinity, wherein a profile of a first micro lens at an outer portion of said micro lens assembly is different than a profile of a second micro lens at an inner portion of said micro lens assembly; and
    a controller in communication with said imager, wherein said controller is configured to output a signal for controlling a function of the vehicle, said signal based upon said depth data determined from said multi-focus image.

13. The imager system of claim 12, wherein said micro lens profiles are one of circular, rectangular, hexagonal, and octagonal.

14. The imager system of claim 12, wherein said function of the vehicle that is controlled based upon said signal is at least one of headlamp control, forward collision warning, lane keeping assist, object detection, pedestrian detection, traffic sign recognition, displaying an image, occupant detection, and intruder detection.

15. The imager system of claim 12, wherein said function of the vehicle that is controlled based upon said signal is object detection for collision avoidance, and an imaged object is ignored if said imaged object is imaged by less than about four pixels of said array of pixels.

16. The imager system of claim 12, wherein said at least one imager comprises a plurality of imagers in optical communication with said main lens assembly.

17. The imager system of claim 12, wherein micro lenses of said micro lens assembly are configured to enhance effectiveness of imaging on said pixel array.

18. The imager system of claim 17, wherein said micro lenses of said micro lens assembly are substantially hexagonally shaped.

19. The imager system of claim 12, wherein said controller comprises at least one of a field programmable gate array (FPGA), a digital signal processor (DSP), and a parallel RISC/CISC.

20. The imager system of claim 12, wherein said main lens assembly and said micro lens assembly are configured to enhance spatial recognition in one of a vertical axis and horizontal axis.

21. The imager system of claim 20, wherein said main lens assembly and said micro lens assembly are elliptical.

22. The imager system of claim 12, wherein said at least one imager comprises at least two of a first imager comprising a main lens assembly and a micro lens assembly configured for imaging a near-field scene, a second imager comprising a main lens assembly and a micro lens assembly configured for imaging a mid-field scene, and a third imager comprising a main lens assembly and a micro lens assembly configured for imaging a far-field scene.

23. An imager system configured for a vehicle control system, said imager system comprising:
- at least one imager configured to capture a multi-focus image having depth data, said imager comprising:
  - an image sensor comprising an array of pixels; and
  - an optics assembly in optical communication with said image sensor, said optics assembly configured to capture light rays, wherein said optics assembly comprising:
    - a main lens assembly configured to substantially focus a scene on to a plane;
    - a micro lens assembly in optical communication between said main lens and said image sensor to substantially focus on to same said plane as said main lens assembly extending out to infinity, wherein said micro lens assembly comprises an inner portion and an outer portion, said inner portion having a different focal length than said outer portion; and
- a controller in communication with said imager, wherein said controller is configured to output a signal for controlling a function of the vehicle, said signal based upon said depth data determined from said multi-focus image.

24. The imager system of claim 23, wherein said function of the vehicle that is controlled based upon said signal is at least one of headlamp control, forward collision warning, lane keeping assist, object detection, pedestrian detection, traffic sign recognition, displaying an image, occupant detection, and intruder detection.

25. The imager system of claim 23, wherein said function of the vehicle that is controlled based upon said signal is object detection for collision avoidance, and an imaged object is ignored if said imaged object is imaged by less than about four pixels of said array of pixels.

26. The imager system of claim 23, wherein said at least one imager comprises a plurality of imagers in optical communication with said main lens assembly.

27. The imager system of claim 23, wherein micro lenses of said micro lens assembly are configured to enhance effectiveness of imaging on said pixel array.

28. The imager system of claim 27, wherein said micro lenses of said micro lens assembly are substantially hexagonally shaped.

29. The imager system of claim 23, wherein said controller comprises at least one of a field programmable gate array (FPGA), a digital signal processor (DSP), and a parallel RISC/CISC.

30. The imager system of claim 23, wherein said main lens assembly and said micro lens assembly are configured to enhance spatial recognition in one of a vertical axis and horizontal axis.

31. The imager system of claim 30, wherein said main lens assembly and said micro lens assembly are elliptical.

32. The imager system of claim 23, wherein said at least one imager comprises at least two of a first imager comprising a main lens assembly and a micro lens assembly configured for imaging a near-field scene, a second imager comprising a main lens assembly and a micro lens assembly configured for imaging a mid-field scene, and a third imager comprising a main lens assembly and a micro lens assembly configured for imaging a far-field scene.

33. An imager system configured for a vehicle control system, said imager system comprising:
- at least one imager configured to capture a multi-focus image having depth data, said imager comprising:
  - an image sensor comprising an array of pixels; and
  - an optics assembly in optical communication with said image sensor, said optics assembly configured to capture light rays, wherein said optics assembly comprising:
    - a main lens assembly configured to substantially focus a scene on to a plane;
    - a micro lens assembly in optical communication between said main lens and said image sensor to substantially focus on to same said plane as said main lens assembly extending out to infinity;
- a controller in communication with said imager, wherein said controller is configured to output a signal for controlling a function of the vehicle, said signal based upon said depth data determined from said multi-focus image; and
- an electro-optic lens assembly in optical communication with said main lens assembly, wherein said electro-optic lens assembly is configured to alter transmittance states to define an aperture with respect to said main lens assembly, said micro lens assembly, and said imager.

34. The imager system of claim 33, wherein said function of the vehicle that is controlled based upon said signal is at least one of headlamp control, forward collision warning, lane keeping assist, object detection, pedestrian detection, traffic sign recognition, displaying an image, occupant detection, and intruder detection.

35. The imager system of claim 33, wherein said function of the vehicle that is controlled based upon said signal is object detection for collision avoidance, and an imaged object is ignored if said imaged object is imaged by less than about four pixels of said array of pixels.

36. The imager system of claim 33, wherein said at least one imager comprises a plurality of imagers in optical communication with said main lens assembly.

37. The imager system of claim 33, wherein micro lenses of said micro lens assembly are configured to enhance effectiveness of imaging on said pixel array.

38. The imager system of claim 37, wherein said micro lenses of said micro lens assembly are substantially hexagonally shaped.

39. The imager system of claim 33, wherein said controller comprises at least one of a field programmable gate array (FPGA), a digital signal processor (DSP), and a parallel RISC/CISC.

40. The imager system of claim 33, wherein said main lens assembly and said micro lens assembly are configured to enhance spatial recognition in one of a vertical axis and horizontal axis.

41. The imager system of claim 40, wherein said main lens assembly and said micro lens assembly are elliptical.

42. The imager system of claim 33, wherein said at least one imager comprises at least two of a first imager comprising a main lens assembly and a micro lens assembly configured for imaging a near-field scene, a second imager comprising a main lens assembly and a micro lens assembly configured for imaging a mid-field scene, and a third imager comprising a main lens assembly and a micro lens assembly configured for imaging a far-field scene.

43. The imager system of claim 33, wherein said main lens assembly and said micro lens assembly have at least one different diameter, profile, and focal length.

44. The imager system of claim 33, wherein said electro-optic lens assembly is one of an electrochromic aperture assembly and a liquid crystal aperture assembly.

45. An imager system configured for a vehicle control system, said imager system comprising:
- at least one imager configured to capture a multi-focus image having depth data, said imager comprising:
  - an image sensor comprising an array of pixels; and
  - an optics assembly in optical communication with said image sensor, said optics assembly configured to capture light rays, wherein said optics assembly comprising:
    - a main lens assembly configured to substantially focus a scene on to a plane;
    - a micro lens assembly in optical communication between said main lens and said image sensor to substantially focus on to same said plane as said main lens assembly extending out to infinity;
- a controller in communication with said imager, wherein said controller is configured to output a signal for controlling a function of the vehicle, said signal based upon said depth data determined from said multi-focus image; and
- an electro-optic lens assembly in optical communication with said micro lens assembly, wherein said electro-optic lens assembly is configured to alter transmittance states to define an aperture with respect to said micro lens assembly and said imager.

46. The imager system of claim 45, wherein said function of the vehicle that is controlled based upon said signal is at least one of headlamp control, forward collision warning, lane keeping assist, object detection, pedestrian detection, traffic sign recognition, displaying an image, occupant detection, and intruder detection.

47. The imager system of claim 45, wherein said function of the vehicle that is controlled based upon said signal is object detection for collision avoidance, and an imaged object is ignored if said imaged object is imaged by less than about four pixels of said array of pixels.

48. The imager system of claim 45, wherein said at least one imager comprises a plurality of imagers in optical communication with said main lens assembly.

49. The imager system of claim 45, wherein micro lenses of said micro lens assembly are configured to enhance effectiveness of imaging on said pixel array.

50. The imager system of claim 49, wherein said micro lenses of said micro lens assembly are substantially hexagonally shaped.

51. The imager system of claim 45, wherein said controller comprises at least one of a field programmable gate array (FPGA), a digital signal processor (DSP), and a parallel RISC/CISC.

52. The imager system of claim 45, wherein said main lens assembly and said micro lens assembly are configured to enhance spatial recognition in one of a vertical axis and horizontal axis.

53. The imager system of claim 52, wherein said main lens assembly and said micro lens assembly are elliptical.

54. The imager system of claim 45, wherein said at least one imager comprises at least two of a first imager comprising a main lens assembly and a micro lens assembly configured for imaging a near-field scene, a second imager comprising a main lens assembly and a micro lens assembly configured for imaging a mid-field scene, and a third imager comprising a main lens assembly and a micro lens assembly configured for imaging a far-field scene.

55. The imager system of claim 45, wherein said main lens assembly and said micro lens assembly have at least one different diameter, profile, and focal length.

56. The imager system of claim 45, wherein said electro-optic lens assembly is one of an electrochromic aperture assembly and a liquid crystal aperture assembly.

* * * * *